Figure 1:
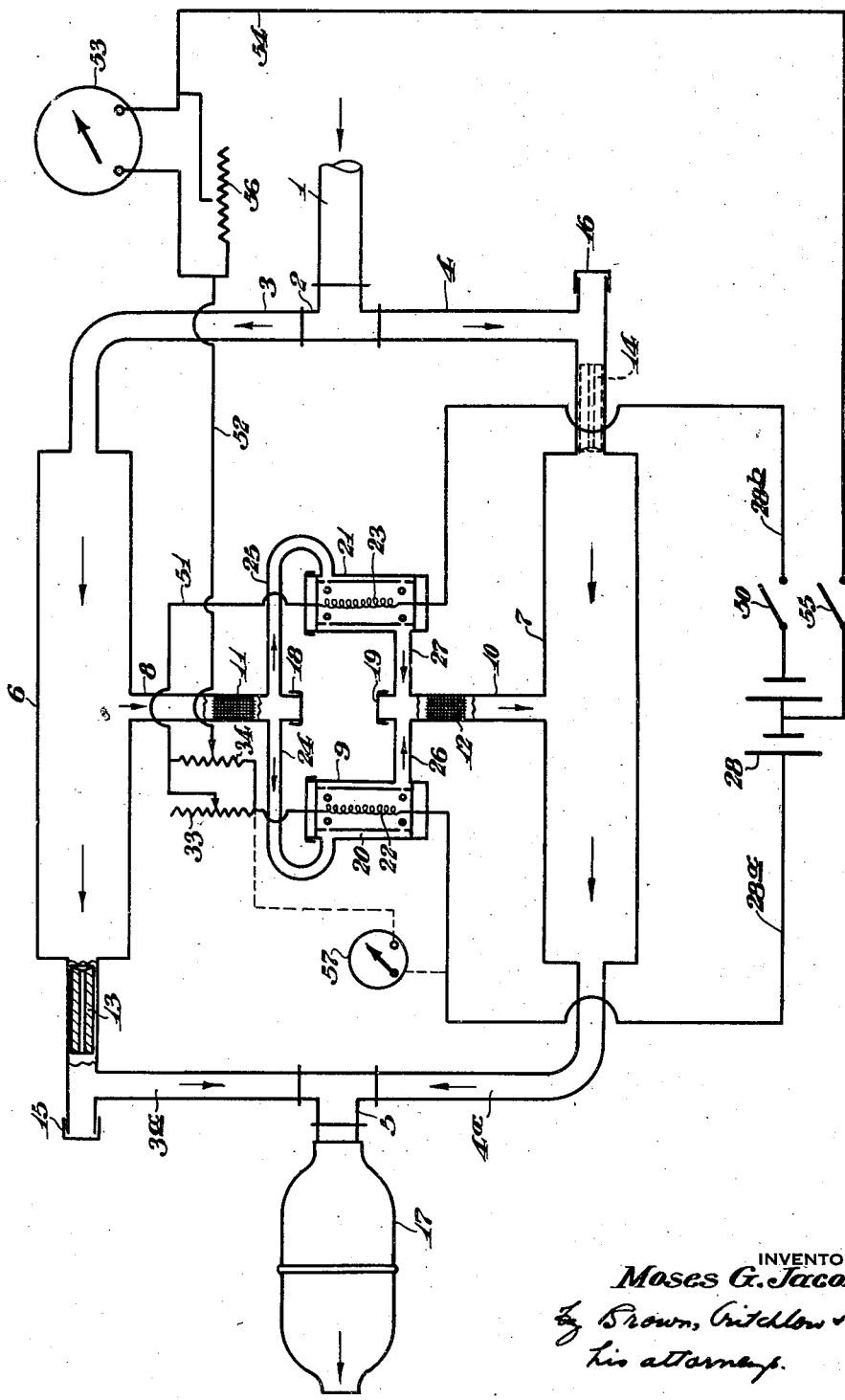

April 19, 1938.　　　M. G. JACOBSON　　　2,114,383
GAS TESTING METHOD AND APPARATUS
Filed Feb. 15, 1934　　　2 Sheets-Sheet 1

INVENTOR
Moses G. Jacobson.
By Brown, Critchlow & Flick
his attorneys.

April 19, 1938.    M. G. JACOBSON    2,114,383
GAS TESTING METHOD AND APPARATUS
Filed Feb. 15, 1934    2 Sheets—Sheet 2
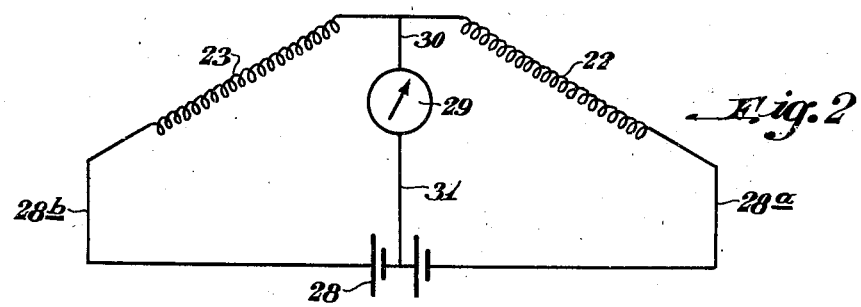
Fig. 2
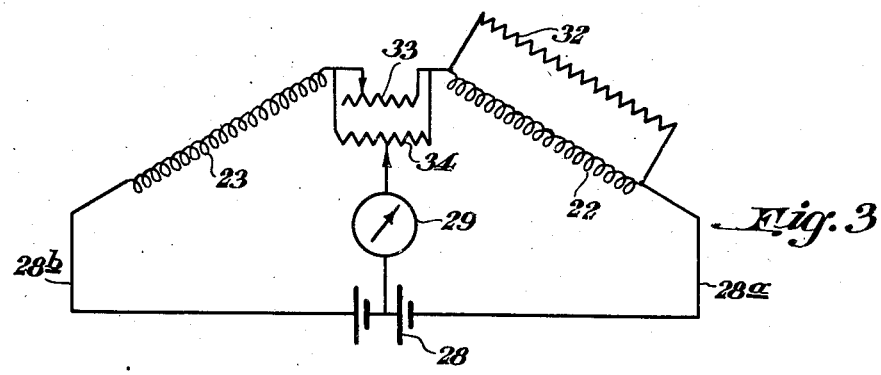
Fig. 3
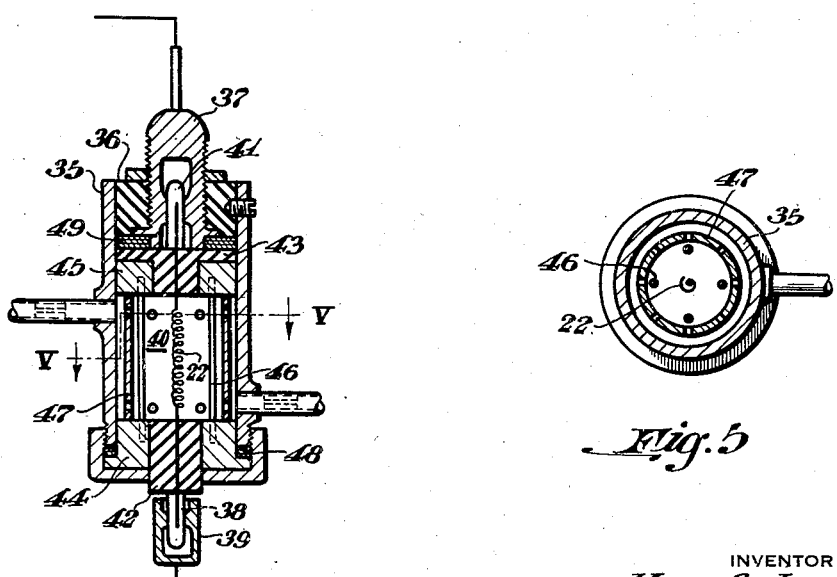
Fig. 4
Fig. 5
INVENTOR
Moses G. Jacobson
by Brown, Critchlow & Flick
his attorneys.

Patented Apr. 19, 1938

2,114,383

UNITED STATES PATENT OFFICE 2,114,383

GAS TESTING METHOD AND APPARATUS

Moses G. Jacobson, Swissvale, Pa., assignor to Mine Safety Appliances Company, Pittsburgh, Pa., a corporation of Pennsylvania Application February 15, 1934, Serial No. 711,398

5 Claims. (Cl. 23—255)

This invention relates to gas testing by passing the gas into contact with a heated filament and using the change in resistance of the filament to indicate the result, and more particularly it relates to the determination of the presence and/or amount of a combustible constituent in a gas, such as mixtures of one or more flammable or oxidizable gases or vapors in air.

A particular object of the invention is to provide an improved gas testing method and apparatus of the general type referred to which embody greater sensitivity for small current consumption than heretofore, which require fewer batteries than are necessary in ordinary potentiometric methods and apparatus, and less current than is needed in Wheatstone bridge methods, which are simple and readily used, and the apparatus of which may be embodied relatively cheaply and in compact and readily portable form.

A special object is to provide for maintenance of high sensitivity in an apparatus of the type referred to up to the last hours of filament life.

A further object is to provide for ready, simple, rapid and accurate checking and adjustment of the zero setting in an atmosphere.

Still another object is to provide a flow system which eliminates the influence of humidity in the gas being tested and the effect of changes in barometric pressure, provides desirably small flow but does not necessitate minute flow orifices, and minimizes lag in response.

Other objects will be understood from the following description.

The invention may be described in connection with the accompanying drawings, in which Fig. 1 is a schematic view of the preferred embodiment of the apparatus and its electrical circuit; Fig. 2 a wiring diagram illustrative of the circuit method embodied in the invention; Fig. 3 a view similar to Fig. 2 showing a refinement of the circuit; Fig. 4 a longitudinal sectional view through the preferred embodiment of testing element; and Fig. 5 a cross sectional view through the element of Fig. 4, taken on line V—V thereof.

The invention relates generally to the analysis of gases to ascertain the presence and amount of combustible gas or vapor present therein, such as the presence of methane in mine air, by a method in which the gas to be tested is passed into contact with a testing filament, or resistance element, in an electric circuit, the filament being catalytically activated or heated, or both, whereby any combustible constituent in the sample is oxidized, thus causing the resistance of the testing filament to change, and the change in resistance is applied to indicate the presence and concentration of the combustible constituent.

The methods and apparatus heretofore available for this purpose have suffered from various disadvantages. Thus they are either deficient in sensitivity, or retention of sensitivity, or they consume heavy currents, require large, or a multiplicity of, batteries, so that they are not readily portable, and battery life is short. Also, they are generally incapable of adjustment and zero checking except in pure air. These and other disadvantages are well known to those skilled in the art.

The present invention is predicated in part upon my discovery that important advantages arise from the use of a circuit novel in its application to this subject. In accordance with this aspect of the invention the gas is passed into contact with a heated testing filament in series with another, compensating filament, through which current is passed from a battery, and the change in resistance of the testing filament is measured by suitable means, such as a delicate meter, connected on one side to the junction of the two filaments and on the other side between two cells of the battery at a point such that the battery is divided into two groups of cells whose electromotive forces are proportional to the resistances of the filaments. Various major advantages, presently to be explained, are obtained from such a circuit and testing method.

The invention is predicated further upon a flow system in which the gas sample is divided into two streams flowing in parallel, and by-passing a portion of the gas from one branch through the testing unit connected as a bridge between the two branch streams. In this manner low and adjustable rates of flow through the testing unit are possible, with concomitant repression or elimination of the disadvantages heretofore presented in connection with this aspect of prior testing methods.

A further important feature of the invention resides in passing the gas over both the testing and the compensating filaments, the latter being rendered catalytically inactive. This eliminates the influences of humidity and changes in barometric pressure.

Further important aspects of the invention reside in the provision of means for checking and adjusting the zero setting in any atmosphere, and for maintaining the constancy of the initial temperature of the testing element. The former is attained by flowing the gas in a direction opposite that of thermal convection, while the latter is reached by maintaining the voltage applied to the testing element at a constant predetermined value.

The foregoing major features of the invention and their significance will now be elaborated more fully.

Having reference now to Fig. 1 of the drawings, the sample of gas to be tested is drawn into a sampling line 1 and this main stream of gas is divided into two branch streams, as by connecting the sampling line to a T 2 whose arms open into branch conduits 3 and 4 having extensions 3a and 4a which converge at a T-connection 5 from which the gas passes to the atmosphere. The gas stream passing through one of the branch conduits is again divided to by-pass a portion of the gas flowing therethrough into a testing unit which exhausts into the other branch conduit. This second, or testing, branch thus constitutes a bridge between the main branch conduits.

In the embodiment shown chambers 6 and 7 of relatively large volume are inserted in the branch conduits, between 3 and 3a, and 4 and 4a, respectively. A conduit 8 leads from one of the chambers, for example 6, to a testing unit, indicated generally by the numeral 9, from which the by-passed test stream passes by a conduit 10 to the other chamber, 7 in this instance. Flash-back arresters 11 and 12 of suitable form are interposed before and after the testing unit in conduits 8 and 10.

A flow-restricting member 13, such as a bushing having a reduced bore, is inserted in conduit 3a adjacent the outlet from container 6, and a similar member 14 is inserted in conduit 4 at the inlet to container 7. The bores of these members need not be small, especially where large flow through the testing unit is not needed. By varying the size of the bores of these members, either or both, variable rates of flow may be attained. To this end these portions of the conduits are provided with extensions, as shown, closed by removable caps 15 and 16, and members 13 and 14 are removably mounted in the conduits, as by being screw threaded therein, or by making a sliding fit in the conduits. Or, if desired, flow-regulating valves, such as needle valves, may be used.

Preferably, conduits 8 and 10 are connected to containers, but variations in flow through the bridge branch (between containers 6 and 7) may be had by moving either conduit 8 or 10 to the left or right of center of its container.

In this manner a sample of gas passed into the apparatus through intake line 1 is broken into two streams at the T 2, one stream passing through conduit 3 and another through conduit 4. In container 6 one of the branch streams is again divided, one portion continuing through the container and branch 3a, and the other portion passing through testing unit 9, thence into container 7 where it joins the other branch stream and flows thence through conduit 4a to the outlet 5.

The sample may be drawn through the container in any suitable way, as by means of a suction pump connected to outlet 5, or by means of a pressure pump disposed ahead of T 2. For many purposes, as in portable apparatus, however, it is preferred to use an aspirator bulb 17 connected to the outlet of T 5.

By suitably selecting the flow controlling members 13 and 14 the flow through the elements of testing unit 9 can be varied and adjusted to any value from a little less than the maximum flow provided by the pump or aspirating bulb, down to zero. Experience has shown that gas indicators of the type contemplated herein operate most efficiently with a flow of from about ½ to 1 liter per minute past the heated filament. Most pumps available on the market do not operate well at a flow of less than about 6 liters per minute, wherefore the use of capillaries, or similar small flow-resisting orifices, has been necessary. Such use of small orifices is objectionable because of manufacturing difficulties and because they readily become clogged by dust and dirt.

The only flow system available heretofore which would combine high flow through the pump with low flow through the filament container is that in which the filament container is disposed in a branch connected in parallel with the main conduit leading to the pump. However, if a flow ratio of 1:6 or 1:10 is to be maintained between the branch and the main conduits, the total flow resistance of the branch line can not be made very high, so that with such a system it is difficult to maintain this resistance and the flow past the filament constant.

The flow system just described is free from the foregoing and other shortcomings of prior means and modes of gas analysis in that the flow resistance of the bridge branch, in which the testing unit is located, can be made large enough to be free from the influence of reasonable variations in the flow resistance of its elements. Experience with apparatus constructed in accordance with this invention has shown that the resistances of the flash-back arresters 11 and 12 are large enough for this purpose, and therefore no small capillary orifices need be used.

In addition, this flow system provides for the use of a pump of much higher capacity than could be used heretofore, which greatly increases the speed of transferring the sample from the atmosphere, or intake of the sampling line, to the testing unit, which reduces the lag in indication. A change from one pump to another will not require, as in other systems, a change in the flow resistances of the branch containing the testing filament. It requires only a change in one of the flow controlling members 13 or 14, and in contrast to prior apparatus, the smaller the flow through the testing unit is to be, the larger the bore diameter of the flow restricter must be. Likewise, with a comparatively small range of adjustment of the restricters, or by means of a variable valve, large variations in pump efficiency or in length of sampling line can be taken care of. Such a flow system is applicable generally to this general type of gas analysis, the particular construction and circuits of the testing unit being not critical as regards this feature.

To provide for changing the flash-back arresters, conduits 8 and 10 are provided with removable closure caps 18 and 19, respectively.

The testing unit 9 may be of any suitable type. That provided by this invention, and shown schematically in Fig. 1, comprises a pair of elements in the form of containers 20 and 21 having filaments 22 and 23, respectively, extending therethrough. Conduits 24 and 25 connect containers 20 and 21, respectively, to bridge conduit 8, and the gas passed through the bridge branch passes to container 7 through conduits 26 and 27.

Heretofore in two-wire types of apparatus it has been customary to conduct the sample to be tested over one of a pair of electrically heated filaments adapted to cause combustion of a combustible constituent in the gas. The other heated filament, used for compensation purposes, has been customarily sealed in air or other constant atmosphere, it being not possible heretofore to expose the sample to both filaments, because combustion would have been caused in each, which would have precluded any determination.

Experience has shown also that detectors of this type are influenced by the humidity of the gas being tested, which is especially serious in detecting methane in small concentrations in mine atmospheres, where the relative humidity may vary from about 30 to 100 per cent. Such amounts of water vapor cause changes in thermal conductivity which detrimentally affect the reliability of the apparatus. To take care of this factor it has been necessary to pass the gas to be tested through a drying tube filled with calcium chloride or other drying agent, which has rendered the apparatus susceptible to false indications if the drying material becomes exhausted or fails to operate satisfactorily, which has rendered the apparatus more complicated and cumbersome, and has endangered its reliability.

As a further result of the prior practice, it has not been possible accurately to check the zero adjustment without access to an atmosphere of air free from combustible gases. This has been especially objectionable in the use of such apparatus in mines, where pure air may not be available within a distance of several miles, or in submarines where pure air may be not accessible for prolonged periods of time.

In the practice of this invention the foregoing and other disadvantages are overcome by passing the gas sample over both of the heated filaments, and in accordance with the invention one of the filaments, which constitutes the testing unit, is catalytically active, as, for example, by being composed of platinum treated to confer catalytic oxidizing properties, while the other is catalytically inactive, or is rendered so. Most suitably the compensating filament is formed of platinum and prior to use is subjected to one of the known catalyst poisons, such as phosphine or arsine, so that no combustion of combustible constituents in the gas occurs when the sample is passed through the compensating element. Moreover, this prevents the compensating filament from becoming activated in gas atmospheres, and it insures retention of the inactive state. And as indicated hereinabove, it is preferred to mount the filaments as separate elements, using separate gas streams, although it is possible to pass a single gas stream over both filaments mounted in a single container.

In this manner the sample may be passed concurrently in branch streams over the testing and compensating filaments to obtain the indication due to change in resistance of the testing filament through the heat liberated in combustion of a combustible constituent, or constituents, present in the gas, while the aforementioned influences are eliminated. This also eliminates the influence of humidity, since both of the filaments are subjected to the gas under test and the influence of humidity is substantially equal on both filaments.

This type of two-element unit in which gas is passed over both elements has the further advantage that changes in barometric pressure have no effect on the reliability of the unit. In prior practice the compensating filament has been sealed in a container filled with air, and it has been necessary usually to make zero settings at atmospheric pressure. Therefore a change in barometric pressure of sampling, i. e., in use, has thrown the apparatus out of balance. Thus, an increase in pressure and density increases the rate of heat transfer from the testing filament, thereby lowering its temperature, while no such result occurs with the sealed compensating filament. This may occur with an apparatus calibrated at the surface of the earth and used in a deep mine, or in a submarine or aircraft. Such a result will throw the instrument out of balance and will result in a fictitious indication.

In the present invention any changes due to variations in barometric pressure are substantially equal for both filaments, so that once a balance is obtained and indicated by a zero adjustment, the adjustment will be maintained against any reasonable changes of barometric pressure.

In prior practice the heated filaments have commonly been embodied in Wheatstone bridge circuits for the purpose of measuring changes in resistance of the testing filament caused by a combustible gas in the sample undergoing test. The Wheatstone bridge circuit may be used with certain features of the invention described hereinabove, as will be recognized. But as ordinarily constructed this circuit entails relatively large current consumption, because in addition to the relatively heavy current required in the testing branch, there is required a nearly equal current in the other branch unless the resistance of the latter is made higher than usual, in which case sensitivity is sacrificed.

In accordance with the present invention a novel testing circuit is used which embodies advantages over both Wheatstone bridge and ordinary potentiometric methods. To this end the testing and compensating filaments are connected in series with a battery, changes in resistance of the testing filaments being measured by sensitive measuring or indicating means connected between the junction of the two filaments and the battery in such manner that the battery is subdivided into two groups of cells whose electromotive forces are proportional to the resistances of the filaments.

In the preferred embodiment of the invention the resistances of the testing and compensating filaments are equal and the battery comprises an equal number of cells, while the measuring circuit is connected between the junction of the filaments and the midpoint of the battery. The filaments having equal resistances, and there being the same number of batteries on each side of the connection, the electromotive forces are thus proportional to the resistances of the filaments.

Wiring for such a circuit is shown schematically in Fig. 2. The testing filament, for example 22, and the compensating filament 23, are connected in series with each other and by conductors 28a and 28b with a battery 28 composed of an equal number of cells, two being shown by way of example. Changes in resistance of the testing filament are measured by a sensitive measuring instrument 29, such as a milliammeter, connected by a conductor 30 to the junction between the two filaments, and by a conductor 31 to the midpoint of battery 28.

This novel mode of supplying heating current to the testing unit and of measuring the changes in resistance of the testing filament caused by combustible gases in the sample affords major advantages over all prior methods known to me. As compared with a Wheatstone bridge it uses about one-half the current required in the latter, for reasons given hereinabove. Hence, in the best current condition for Wheatstone bridge circuits less than one-half of the battery life is obtained, as compared with this invention, with not quite the same sensitivity as is provided by this invention. As compared with ordinary potentiometer circuits, one less battery is required. In a potentiometer circuit of the usual type there is needed, in addition to the battery supplying heating current, a second battery in the branch circuit to balance the voltage drop in the testing filament. This compensating battery is eliminated in the present invention.

There is also the further advantage that if the cells making up the battery used in the present invention are alike in their E. M. F. and shelf age, a balance once obtained, in case of constant circuit resistance, will not be destroyed by the gradual decrease in the E. M. F. of the batteries, because of the proportionality between the resistances and the battery currents. In the potentiometer circuit in order to obtain this condition it is necessary that the voltage of the compensating cell must decrease in the same proportion as that of the heating batteries, which condition does not usually prevail. The saving in current consumption provided by the invention is especially important as applied to portable apparatus. If large current is required, heavy batteries are needed, which has limited the use of such apparatus for work such as in mines, etc. Also, it provides longer battery life.

Metal filaments when heated to a glowing temperature evaporate slowly, and this phenomenon is accelerated when combustion of a gas or vapor takes place at the surface of the filament. This causes the diameter of the filament to gradually decrease, thus increasing its resistance, and therefore its temperature for a given voltage. Heretofore this has caused a gradual change in the sensitivity of the apparatus, which has necessitated recalibration at frequent intervals, because for most gases and vapors (except $CH_4$ and $C_2H_6$) this increase in initial filament temperature causes a decrease in sensitivity.

A special feature of the invention resides in provision of means for maintaining constancy of initial filament temperature. For this purpose the voltage applied to the detector unit, e. g., the testing filament, is maintained constant by maintaining a constant current, corresponding to a constant check reading determined by the characteristics of the filament, in a constant resistance shunt around the detector unit. This is illustrated in Fig. 3, in which a constant resistance 32 is shunted around the testing filament 22. During use of the apparatus, for example between two determinations, the voltage across the filament 22 is checked, and if it is not the predetermined value for conferring the desired initial filament temperature, rheostat 33 is moved to bring the voltage back to its predetermined value. Thereby a constant voltage is maintained in filament 22, which is accordingly consistently kept at a constant initial temperature, whereby accuracy is assured. The check reading may be made by using meter 29 and a double switch with suitable connections, as will be understood by those skilled in the art. Or, a voltmeter may be connected across filament 22 in place of shunt 32, to obtain a direct reading, the resistance of the voltmeter affording the necessary shunt resistance.

The belief in the art has been that in order to increase the life of catalytically activated heated platinum filaments when used for this purpose it was necessary to increase the diameter of the wire, or the thickness of the ribbon. I have found, however, that this is not necessary, and that the life of such filaments actually may be increased by decreasing the diameter, or thickness, of the filament. This has the additional and important advantage that the sensitivity of the instrument is increased, because this results in an increase in the ratio of surface to mass, which ratio determines the increase in temperature and hence the increase in resistance of the wire upon combustion of gas.

When a coiled wire is used the mechanical strength is considerably decreased by decreasing the diameter of the wire. I have found, however, that this difficulty may be simply compensated for by proportionately decreasing the diameter of the coil, and experience has shown that in this manner it is entirely practical to use a wire as fine as No. 48 gauge.

Further benefits that flow from the use of finer wire than heretofore used are that the current consumption is reduced, whereby smaller and lighter batteries may be used, or longer battery life is obtained.

In the preferred embodiment of the invention the testing filaments are embodied in elements of special design illustrated in Figs. 4 and 5. These comprise a housing 35 having an inlet opening connected to the bridge branch conduit 24 or 25 for introduction of the gas sample, and an outlet opening adapted to be connected to bridge branch conduit 26 or 27, as the case may be. Housing 35 may be cylindrical and it is closed at one end by an annular plug 36 of insulating material through which there extends a fixed jack 37 connected to one external lead of the circuit described hereinabove. The other end of the housing is closed by a removable unit including the filament 22 (or 23) which is mounted at one end in an electrically conducting pin 38 connected externally by means of a jack 39 to the lead of the circuit. The filament extends from pin 38 through the gas testing chamber 40 and makes a sliding fit by a connector pin 41 in the fixed jack 37.

Adjacent the pins 38 and 41 filament 22 is fitted in gas-tight manner through plugs 42 and 43 of insulating material which close the central openings of annular metal rings 44 and 45 which make a sliding fit with the walls of the receptacle. They may be withdrawn together with the filament through the open end of the receptacle. Rings 44 and 45 are held in spaced relation by posts 46.

Preferably the combustion space is confined within a cylinder 47 of perforated sheet metal which surrounds the filament about the posts and is provided most suitably with perforations near its top and bottom. After the insertion of the resistance into the jack the unit is locked in the receptacle by a cap screw 48 threaded into the open end of the receptacle. Preferably also gas-tight gaskets 49 are disposed at each end of the element, as shown in Fig. 4.

It will be observed that in the preferred embodiment the filament is positioned vertically, the gas inlet conduit is connected to the upper part of the element, and the outlet conduit leads from the lower part of the element. This provides an important advantage of the present invention. A weak point of prior gas analysis apparatus of this general type has been that in order to adjust the current, and thereby the initial temperature, of the filament to its proper value, the operator must return the instrument to a known source of pure air. Thus, when working in an atmosphere which contains, or may possibly contain combustibles, such as in a mine, it has been necessary to return to the earth's surface, or the main air entry, to check and correct the zero adjustment. This has been disadvantageous, as in mine work where fresh air may be a considerable distance away, or may be not readily available, as in submarines. Although the elements preferably are disposed vertically, they may be placed horizontally with the gas intake on the upper side so that the gas flow is countercurrent to the normal thermal convection.

The elements just described provide for all atmospheres a condition which is, for all practical purposes, identical with a fresh air atmosphere inside the unit. Thus, the sample flows through the testing chamber in a direction opposite to that of thermal convection because the sample flows downwardly through the element. When aspiration of the sample is stopped the natural up-draft of the hot combustion gases opposes the inflow of gas from the intake of the apparatus. To prevent some of the unburned part of the sample, which has passed out of the element chamber, from being drawn back into the element chamber, a suitable flow resistance is used. The flash-back arrester 12, Fig. 1, serves this purpose. With another flow resistance (11) at the intake, the drawing in of a new sample to the unit after aspiration is stopped, is completely eliminated.

In this indicator, therefore, a few minutes after aspiration has stopped all combustible constituents inside of the element chamber have been completely burned out, the change in the filament temperature due to the decrease in thermal conductivity produced by the products of combustion in the element chamber is substantially negligible, even after an explosive mixture has been tested, as has been demonstrated by extensive practice of the invention.

It is possible, therefore, with the apparatus provided by this invention to check the apparatus under any condition with the same accuracy as though it were returned to a pure air atmosphere.

The circuit illustrated in Fig. 3 has been shown applied to the apparatus of Fig. 1 for description of the mode of applying the invention. In the use of the apparatus shown in Fig. 1, the two elements 20 and 21 of the detector, or testing, unit preferably are of the form described hereinabove. Battery 28 is connected by a conductor 28a to filament 22, and filament 23 is connected to the battery through a conductor 28b, a switch 50 being inserted in this circuit. The two filaments are connected in series through a potentiometer rheostat 34, Figs. 1 and 3, and conductor 51, the current adjusting rheostat 33 being connected as shown in Figs. 1 and 3. A conductor 52 connected to the slider of rheostat 34 connects it to one terminal of the indicating meter 53, the other terminal being connected by a lead 54 and switch 55 to the midpoint of battery 28. A rheostat 56 may be connected to meter 53, as shown, to regulate its sensitivity, and a voltmeter 57, representing shunt 32 of Fig. 3, is connected across the ends of filament 22.

In the use of this apparatus switches 50 and 55 are closed, whereby heating current flows through the testing unit. The initial temperature of the testing filament is checked by voltmeter 57, and if the proper predetermined voltage is not applied to the filament, rheostat 33 is adjusted to set the voltage at the predetermined value most suitable for the characteristics of the filament, thus setting its initial temperature. If the indicator 53 does not read zero, rheostat 34 is adjusted to bring the instrument to its zero setting.

The apparatus is now ready for use, and gas is drawn through it in the manner described hereinabove. A combustible constituent in the gas is oxidized by filament 22, causing the latter to become hotter and to change in resistance. This causes a direct reading on meter 53. This meter may be calibrated according to need, using known gas mixtures, e. g., to give direct readings of degree of combustibility, or concentration of methane, or the like.

As often as need be the voltage applied to the testing filament is checked in the manner described, and adjusted, where necessary, by rheostat 33. Likewise, zero setting may be adjusted when necessary by potentiometer rheostat 34. In the latter instance aspiration of gas is stopped, and after a short interval, say 3 to 5 minutes, all combustibles in the residual gas will have been oxidized. Up-flow of hot products of combustion will prevent entry of fresh gas, and the indicator should read zero. If it does not the proper adjustment is made. Of course, meter 53 may be either a meter or a recording device, or other similar element.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a method of testing a gas for combustible constituents, the steps of passing a stream of the gas into contact with a heated catalytically active testing filament, passing a separate stream of the gas into contact with a substantially equivalent catalytically inactive compensating filament in series with said testing filament, passing an electric current through said filaments from a battery consisting of two groups of substantially equivalent cells in series, measuring the change in resistance of the testing filament caused by said gas by means of an electrical meter connected to the junction between said filaments on one side and the junction between said groups of cells on the other side, and maintaining a constant voltage in said testing filament to thereby maintain its initial temperature constant.

2. In a method of testing gas for combustible constituents in which the gas is passed into contact with a heated testing filament connected in a balanced electrical circuit with at least one more similar heated filament and the change in resistance of said testing filament is measured, the step comprising measuring the voltage directly applied to the terminals of said testing filament and adjusting said voltage as necessary to maintain it at a predetermined constant value, and thereby maintaining constant initial temperature of said testing filament against changes of diameter caused by evaporation of the testing filament material.

3. In an apparatus for detecting a combustible constituent in a gas, the combination of a balanced circuit including a battery of a plurality of cells in series, two filaments whose resistances are proportioned according to the electromotive forces of one or more of said cells, one of said filaments being active and the other inactive with respect to said constituent, a potentiometer rheostat connecting said filaments in series with each other, series connections between the filaments and said battery, a second rheostat in parallel with said potentiometer rheostat for current adjustment, and a sensitive electrical measuring instrument responsive to small currents having one terminal connected to the slider terminal of said potentiometer rheostat, and the other terminal connected between two adjoining cells of said battery to subdivide the battery into two groups of cells whose electromotive forces are proportional to the resistances of said filaments.

4. In an apparatus for detecting a combustible constituent in a gas, the combination of a balanced circuit including a battery of a plurality of cells in series, a catalytically active testing filament, a catalytically inactive filament, the resistances of said filaments being proportioned according to the electromotive forces of one or more of said cells, a potentiometer rheostat connecting said filaments in series with each other, series connections between said filaments and battery, a second rheostat in parallel with the potentiometer rheostat, and a sensitive electrical instrument responsive to small currents having one terminal connected to the slider terminal of said potentiometer rheostat, and the other terminal being connected between two adjoining cells of said battery to subdivide the battery into two groups of cells whose electromotive forces are proportional to the resistances of said filaments, means for flowing separate streams of gas over said filaments, and a voltmeter connected across said testing filament.

5. In a gas testing apparatus, the combination of a balanced circuit with small current consumption including a battery of a plurality of cells in series, two filaments whose resistances are proportioned according to the electromotive forces of one or more of said cells, a potentiometer rheostat connecting said filaments in series with each other, series connections between the filaments and said battery for heating the filaments, a second rheostat in parallel with said potentiometer rheostat for current adjustment, and a sensitive electrical measuring instrument responsive to small currents having one terminal connected to the slider terminal of said potentiometer rheostat, and the other terminal connected between two adjoining cells of said battery to sub-divide the battery into two groups of cells whose electromotive forces are proportional to the resistances of said filaments.

MOSES G. JACOBSON.